Figure 1:
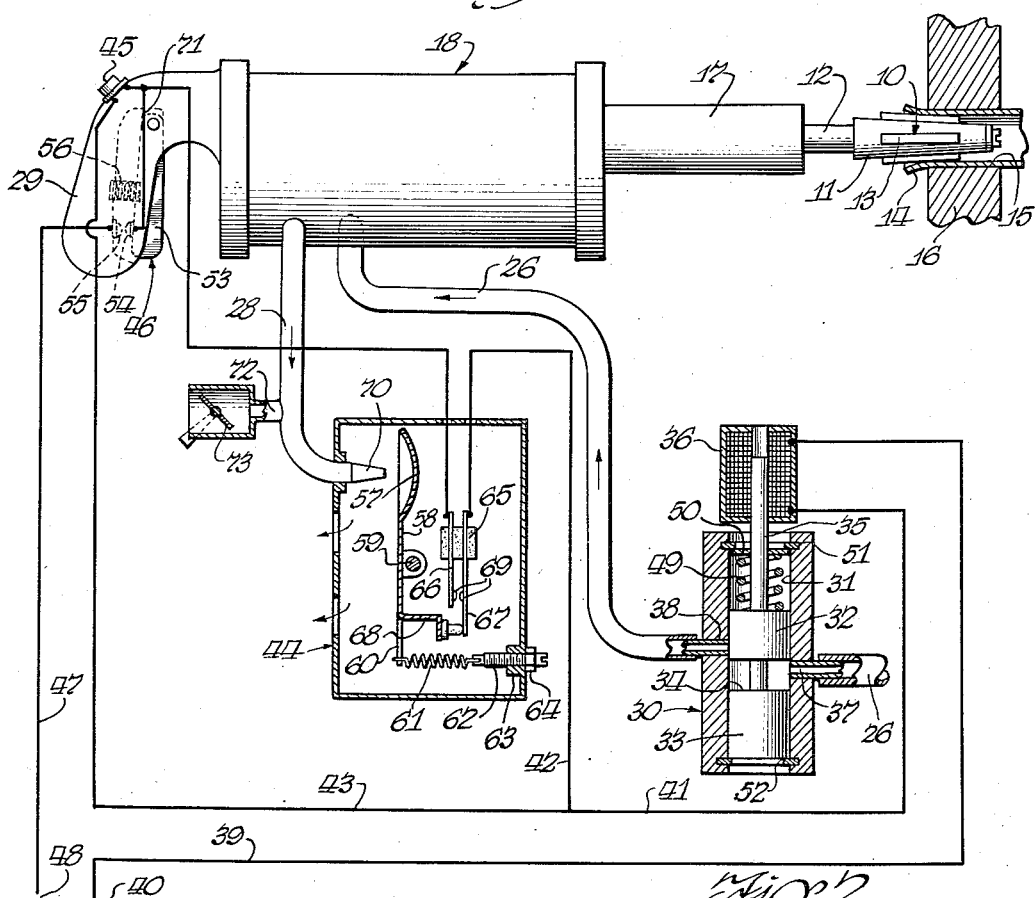

March 4, 1958 C. F. VOYTECH 2,825,353
CONTROL FOR AIR-OPERATED MOTOR
Filed Dec. 9, 1953

Inventor
Charles F. Voytech

2,825,353
CONTROL FOR AIR-OPERATED MOTOR

Charles F. Voytech, Chicago, Ill., assignor to Crane Packing Company, Chicago, Ill., a corporation of Illinois Application December 9, 1953, Serial No. 397,193

4 Claims. (Cl. 137—36)

This invention relates to a control for an air-operated motor and will be described with particular reference to a motor of the vane type which is adapted to turn a shaft at a relatively high speed.

Air operated motors are presently used to tighten or loosen screws, nuts and bolts, to operate drills and in many special applications. One such special application is in driving a rotatable tool known as a "tube expander" which is used to expand the ends of condenser tubes into their respective headers by an internal rolling operation to form a fluid tight connection therebetween. This connection takes the place of packing formerly used for the same purposes. It has been found, however, that when an expander rolls a tube for a longer period of time than is necessary to effect a tight union between the tube and its header, the material of the tube operated upon by the expander will become brittle and the tube will then crack and leak in service.

To prevent an over-rolling of the tube in the aforesaid special application, it is desirable to stop the rolling at the point where a tight union will be effected, all subsequent rolling being useless for this purpose and being responsible for the brittleness of the tube. The rolling can be stopped by the operator if he is skilled and can sense the correct point at which to stop the rolling operation. Such skilled operators, however, are difficult to obtain and it has been found that even with a skilled operator the rolling operation is not uniform from one tube to another.

It has been proposed to adopt automatic means for stopping the rolling operation when it is substantially complete. Such means utilize a motor which is slightly under-powered so that as the tool completes the rolling operation and then attempts to roll beyond that point, the additional resistance to rolling produced by the over-rolling will cause the motor to slow down, and the slowing down of the motor is then utilized to operate a suitable control to stop the motor completely. Where the motor is an electric motor, the stopping can be accomplished by utilizing the increase in the current used to take care of the overload to operate a switch which opens a circuit to the motor and stops it automatically.

The electric control has been adapted to an air-operated motor, a small electric generator driven off the spindle of the air motor being used to generate a current the value of which varies with the speed of the air motor. In this case, a decrease in the current developed below a predetermined value is utilized to operate the stopping mechanism. This type of control is somewhat more complex than is desirable and furthermore involves the use of electrical equipment at the shaft of the motor which may cause sparks and constitute a fire hazard.

One of the characteristics of an air operated motor is that the volume of air leaving the exhaust of the motor is directly proportional to the speed of the motor, assuming that the line pressure to the motor is constant. Thus, if the exhaust volume decreases with a constant line pressure, it may be assumed that the motor is overloaded and has accordingly slowed down. Thus, the volume of air exhausted may be taken as an indication of the torque load on the air motor.

This invention has for one of its principal objects the provision of a control for an air operated motor which will stop the motor upon a predetermined overload condition, the means utilizing a variation in exhaust pressure occasioned by an overload to operate the stopping mechanism for the motor.

A more specific object of this invention is to provide a control for an air operated motor wherein the air intake of the motor is controlled by an electromagnetic device and wherein the exhaust air from the motor is utilized to operate a switch which is adjusted to open a circuit when a predetermined overload condition exists in the motor as indicated by the decrease in the volume of air flowing in the exhaust from the motor. The making or breaking of a contact is then used to operate the electromagnetic control for the motor to shut off the air supply and thereby stop the motor.

A still more specific object of this invention is to provide, for an air operated motor, a control mechanism for the motor which utilizes what is known as a "wind switch" operated by the exhaust air from the motor to control an electromagnetically operated valve in the intake pressure line to the motor.

Figure 3:
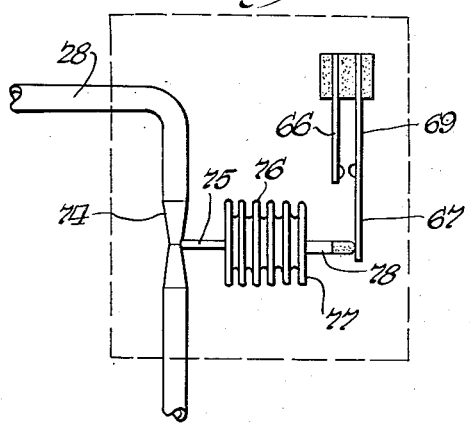
Figure 2:
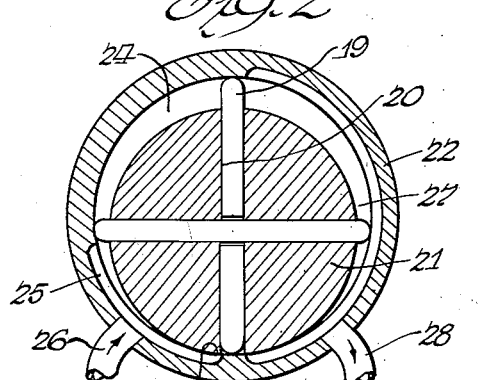

These and other objects of this invention will become apparent from the following detailed description when taken together with the accompanying drawings in which Fig. 1 is a schematic diagram of an air motor incorporating the automatic overload control of this invention;

Fig. 2 is a cross section through the motor showing the vanes which are typical of such motors; and Fig. 3 is a schematic diagram of a modification of a portion of the control for the air motor.

Referring now to the drawings for a detailed description of the invention, the tool to be driven is shown at 10, and for purposes of illustration is comprised of a body member 11 mounted on a shaft 12 and having mounted thereon in tapered relation with respect to the axis of shaft 12, a plurality of rollers 13. The taper is very slight and is intended to expand a tube 14 into an opening 15 provided in a tube sheet 16 of a condenser or the like. It is contemplated that tool 10 will be rotated and advanced into the tube until the tube is expanded sufficiently to form a fluid tight seal betwen itself and tube sheet 16. It is contemplated further that the rotation of tool 10 will be stopped when the fluid tight seal is achieved so that there will be no over-rolling of the tube such as will result in crystallization of the material of the tube which subsequently would cause the tube to crack in service and cause a leak.

Tool 10 is mounted in a suitable chuck 17 which is rotatable with the shaft of an air motor 18 of readily available standard manufacture. The driving means for the motor is shown schematically in Fig. 2 and is comprised of a plurality of vanes 19 disposed for radial reciprocation in slots 20 in the rotor 21 of motor 18. Said rotor 21 is mounted eccentrically with respect to the housing 22 of the motor so as to contact the housing at 23 with a sealing contact and to provide a space 24 increasing in volume from point 23 to the point diametrically opposite thereto. An inlet port 25 disposed to the left of point 23 as viewed in Fig. 2 is connected to the intake or inlet conduit 26 through which air under pressure is admitted to port 25. An outlet port 27 is formed in housing 22 and is connected to outlet or exhaust conduit 28.

Motor 18 is provided with a suitable handle 29 by which it may be held and controlled as will be pointed out hereinafter.

Air under pressure is supplied from a suitable source (not shown) to a valve 30, the body of which may be substantially cylindrical and provided with a round bore 31. A cylindrical valve of the balanced type is disposed in bore 31 and is comprised of spaced lands 32 and 33 forming between them a peripheral groove 34. The stem 35 of the valve extends outwardly from the valve body and into the center of a solenoid 36 to constitute the armature thereof. An inlet port 37 is connected by an extension of conduit 26 to the aforementioned source of air under pressure and an outlet port 38 is connected to conduit 26 to conduct the air under pressure from valve 30 to the air motor.

The control circuit for solenoid 36 includes a lead 39 connected to one terminal 40 of a suitable source of electrical energy (not shown), and a lead 41 having two branches 42 and 43. Branch 42 contains the automatic overload control of this invention shown at 44, and branch 43 contains a manual reset switch 45 located on handle 29 and connected in shunt with the control 44. A manual start switch 46, likewise located in the handle 29, is connected in series with control 44 and its shunt switch 45, and with a lead 47 connected to the other terminal 48 of the aforementioned suitable source of electrical energy.

Valve 30 is designed to be opened when solenoid 36 is energized and closed by spring pressure when solenoid 36 is deenergized, so that if there is a power failure, the motor 18 will be automatically disabled and stopped. To this end, valve 30 is provided with a helical spring 49 compressed between land 32 and a washer 50 held by a snap ring 51 in the upper end of the valve as viewed in Fig. 1. Spring 49 holds the valve in a position to cut off communication between ports 37 and 38. A stop in the form of a snap ring 52 is provided adjacent land 33 to hold the valve in closed position and to limit the movement of the valve. When solenoid 36 is energized, the valve is shifted against the action of spring 49 to a position to allow port 37 to communicate with port 38 through groove 34.

Manually controlled switch 46 in handle 29 is designed to be normally open and to be closed when it is desired to start motor 18. Thus switch 46 is comprised of a pivoted lever 53 having a contact 54 adapted to cooperate with a fixed contact 55 in handle 29. A spring 56 normally keeps contacts 54 and 55 separated.

The automatic control by which valve 30 is closed when the torque load on tool 10 reaches a predetermined value is comprised of a cup-shaped vane 57 mounted on a lever 58 pivoted at 59 to a fixed part of the control. The opposite end 60 of lever 58 is connected by a tension spring 61 to an adjustable abutment comprised of a screw 62 threaded in a boss 63, and a lock-nut 64. The tension in spring 61 may be adjusted to any desired value to regulate the amount of air pressure required to be exerted against cup 57 to cause lever 58 to rotate about its pivot 59. Mounted in control 44 is a switch 65 having a short prong 66 and a long prong 67, the latter being adapted to be contacted by a finger 68 formed in the end 60 of lever 58 and at right angles to the plane thereof. A pair of contacts 69 is mounted in opposed relation on prongs 66 and 67, respectively, the contacts being normally closed, but opened when lever 58 is rotated in a counterclockwise direction about its pivot 59 by spring 61, this action causing the end of finger 68 to strike the long prong 67 and urge it away from prong 66 to separate or open contacts 69.

The outlet conduit 28 passes through an opening in control 44 and terminates in a nozzle 70 which directs the exhaust air from motor 18 against the concave side of vane 57. The control is suitably vented to prevent a build-up of pressure therein which would adversely affect the flow of air from nozzle 70. Thus, when the exhaust pressure is high and overcomes spring 61, vane 57 will be rotated clockwise about pivot 59 and will allow contacts 69 to close, thereby completing the circuit to solenoid 36 and holding valve 30 in its open position. When motor 18 slows down, however, so that less air is exhausted, the pressure exerted by the jet issuing from nozzle 70 upon vane 57 decreases and spring 61 is allowed to rotate vane 57 and lever 58 in a counterclockwise direction until finger 68 strikes prong 67 and opens contacts 69. It is contemplated that the tension of spring 61 will be such that contacts 69 will open when the pressure of the jet upon vanes 67 drops to a value corresponding to the motor speed at which the maximum torque load is attained and at which the motor is to be stopped.

Inasmuch as spring 61 of the control 44 will hold contacts 69 in their open position when motor 18 is stopped, that is, when no air pressure is exerted upon vane 57, the circuit through solenoid 36 will be open and the operation of valve 30 to its open position cannot be effected. To enable motor 18 to start when control 44 is conditioned to open contacts 69, a shunt switch 45 is used, said switch being connected on one side to lead 43 and on the other side to a lead 71 connecting contact 54 to said switch 45. Thus, to start motor 18, switch 45 and manual start switch 46 are operated to energize solenoid 36, and after motor 18 has attained its running speed so that the exhaust jet is sufficiently strong to move vane 57 to allow contacts 69 to close, switch 45 is released while contacts 54 and 55 remain closed, thereby providing a complete circuit through the closed contacts 69 to solenoid 36.

In the operation of the device, assuming that terminals 40 and 48 are connected to a suitable source of electrical energy such as the usual 110 volt 60 cycle line, the tool 10 is applied to the work to be performed, lever 53 is squeezed against handle 29 to close contacts 54 and 55 and the thumb of the operator may be used to press switch 45 to complete the shunt circuit around control 44 to solenoid 36. The energization of solenoid 36 opens valve 30 to admit air under pressure to conduit 26 and thence through the inlet port 25 to the motor 18. As the motor gains speed the exhaust air from the motor will be conducted through the conduit 28 through nozzle 70 with increasing force and against vane 57 to rotate said vane in a clockwise direction until prong 67 is released and contacts 69 are closed. After motor 18 is running at its operative speed, switch 45 is released but lever 53 is maintained in the engaged position of contacts 54 and 55. As the tool 10 continues to operate it will eventually finish its work and the torque load impressed upon the tool by the work will increase to the point where motor 18 will begin to slow down. The slowing down of motor 18 is reflected in a decrease in the amount of air exhausted through conduit 28 which in turn decreases the pressure of the air leaving nozzle 70 and hence vane 57 will be turned in a counterclockwise direction by spring 61, the spring pressure always balancing the pressure of the air issuing from nozzle 70. When the pressure of the air reaches a predetermined value, finger 68 will move prong 67 to the right as viewed in Fig. 1 to open contacts 69, thereby deenergizing solenoid 36 and permitting spring 49 to move the valve to its closed position. In the closed position of the valve, motor 18, of course, ceases to operate.

In place of spring 61, or in addition thereto, the point at which contacts 69 are opened may be regulated by regulating the amount of air issuing from nozzle 70. This may be done by providing a branch conduit 72 in exhaust line 28 which is open to atmosphere, and then regulating the amount of the opening by means of a butterfly valve 73. If desired, the positions of the valve 73 may be suitably indicated and calibrated.

In Fig. 3 is shown a modification of the control 44 utilizing a bellows arrangement in place of the vane 57. Thus conduit 28 is provided with a venturi 74 which is connected by means of a pipe 75 to the interior of a bellows 76. Said bellows 76 is of the metal type and is inherently resilient so that it will normally tend to assume a predetermined volume. The end of bellows 76 secured to pipe 75 is stationary while the opposite end 77 is free to move axially relative to pipe 75. Said end 77 is also hermetically sealed with respect to said bellows 76 so that as pressure within said bellows varies and the bellows contracts or expands, end 77 will be moved axially relative to pipe 75. The axial movement of end 77 is imparted to a rod 78 which is adapted to contact prong 67.

In the operation of the modification showing Fig. 3, as motor 18 rotates at its operative speed the exhaust air in conduit 28 will pass through the venturi 74 and in so passing will create a suction or a reduced pressure in pipe 75 which in turn will reduce the pressure within bellows 76. This will cause end 77 and its associated rod 78 to move to the left away from prong 67, thereby enabling contact 69 to close and to energize solenoid 36. As the speed of motor 18 decreases, due to an overload imposed upon tool 10, and the volume of air passing through conduit 28 correspondingly decreases, the pressure in pipe 75 increases, thereby allowing bellows 76 to expand and move end 77 and its associated rod 78 to the right as viewed in Fig. 3. This movement eventually results in contact with prong 67 and in the opening of contacts 69 to deenergize solenoid 36 and close valve 30. The butterfly valve 73 may be used in connection with the modification showing Fig. 3 if desired.

It is understood that the tool 10 may be a screwdriver, a wrench, a drill, or any other tool which is rotated as it operates and that the scope of the invention therefor is not to be limited to the form disclosed but is to be determined by the appended claims.

I claim:

1. In combination, a portable rotatable pneumatic motor including a driven shaft, the operation of which is to be stopped when the torque thereon exceeds a predetermined value, said motor being of such power as to reduce its speed when said predetermined torque value is reached, a supply conduit for conducting motive air to said air driven motor, an outlet duct conducting the exhaust air from the motor, said motor developing an exhaust flow which decreases as the speed of the motor decreases, a valve disposed in said supply conduit, an electromagnet operatively connected to said valve and operable upon energization thereof to open the valve, an energizing circuit for said electromagnet including a pair of contacts, and a movable vane disposed in said exhaust conduit and operatively connected to said contacts, said vane being responsive to the passage of air through said exhaust conduit and being operable when the rate of flow of air through said conduit attains a predetermined minimum to open said contacts and thus deenergize the electromagnet.

2. The combination described in claim 1, a bleed valve in the exhaust conduit ahead of the vane, said bleed valve being adjustable to vary the flow of the air striking the vane and hence to vary the torque at which the motor is stopped.

3. In combination, a portable rotatable pneumatic motor including a driven shaft, the operation of which is to be stopped when the torque thereon exceeds a predetermined value, said motor being of such power as to reduce its speed when said predetermined torque value is attained, a supply conduit for supplying motive air to said motor, an outlet duct for conducting the exhaust air from the motor, said motor developing an exhaust flow which decreases with the speed of the motor, a valve disposed in said supply conduit, an electromagnet controlling the operation of said valve and operable upon energization thereof to open the valve, an energizing circuit for the electromagnet including a pair of contacts, and means operatively connected to said contacts and operable when a predetermined minimum rate of flow of air through said exhaust conduit is attained to open said contacts.

4. The combination set forth in claim 3 wherein said contact operating means comprises an expansible bellows having one end thereof connected to said contact, a venturi disposed in said exhaust duct, and an air passage extending from the venturi and communicating with the interior of the bellows.

References Cited in the file of this patent

UNITED STATES PATENTS

| | | |
|---|---|---|
| 1,713,442 | Matcovich | May 14, 1929 |
| 1,864,127 | Flanders | June 21, 1932 |
| 2,239,738 | Russell | Apr. 29, 1941 |
| 2,670,001 | McElvenny | Feb. 23, 1954 |